(12) United States Patent
Kimura et al.

(10) Patent No.: US 8,423,709 B2
(45) Date of Patent: Apr. 16, 2013

(54) CONTROLLER

(75) Inventors: Tetsuro Kimura, Tokyo (JP); Shinichi Kanno, Tokyo (JP); Shigehiro Asano, Kanagawa (JP); Kazuhiro Fukutomi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 447 days.

(21) Appl. No.: 12/716,547

(22) Filed: Mar. 3, 2010

(65) Prior Publication Data

US 2011/0060863 A1 Mar. 10, 2011

(30) Foreign Application Priority Data

Sep. 10, 2009 (JP) ................................. 2009-209224

(51) Int. Cl.
*G06F 12/00* (2006.01)
(52) U.S. Cl.
USPC ........... 711/103; 711/100; 711/101; 711/154; 711/163
(58) Field of Classification Search .................. 711/100, 711/101, 103, 154, 163
See application file for complete search history.

(56) References Cited

U.S. PATENT DOCUMENTS

2011/0010521 A1* 1/2011 Wang et al. .................... 711/207

FOREIGN PATENT DOCUMENTS

JP 2005-293119 10/2005

OTHER PUBLICATIONS

U.S. Appl. No. 12/883,796, filed Sep. 16, 2010, Fukutomi, et al.
U.S. Appl. No. 13/420,051, filed Mar. 14, 2012, Hida, et al.
U.S. Appl. No. 12/554,272, filed Sep. 4, 2009, Kenichiro Yoshii, et al.
Curtis E. Stevens, "Information technology—ATA/ATAPI Command Set—2 (ACS-2)", Working Draft Project American National Standard, T13/2015-D, Revision 1a, Mar. 2, 2009, 6 pages.
U.S. Appl. No. 13/218,812, filed Aug. 26, 2011, Fukutomi, et al.

* cited by examiner

*Primary Examiner* — Midys Rojas
(74) *Attorney, Agent, or Firm* — Oblon, Spivak, McClelland, Maier & Neustadt, L.L.P.

(57) ABSTRACT

A controller stores therein a sector address set indicating logical storage positions within a nonvolatile-memory storage area; page addresses indicating, in units of pages, physical storage positions within the nonvolatile-memory storage area; and pieces of management information each indicating whether one or more special sectors each being either a bad sector or a trimmed sector trimmed by a TRIM command are present in the corresponding page, while associating them with each other. When an access to a specified sector address is requested, the device refers to the piece of management information and judges whether any special sector is present in the page identified by the page address corresponding to the sector address. The device generates predetermined response data if the page contains one or more special sectors and accesses the nonvolatile-memory storage position corresponding to the sector address if the page contains no special sector.

10 Claims, 10 Drawing Sheets

CONTROLLER

CROSS-REFERENCE TO RELATED APPLICATIONS

This application is based upon and claims the benefit of priority from the prior Japanese Patent Application No. 2009-209224, filed on Sep. 10, 2009; the entire contents of which are incorporated herein by reference.

BACKGROUND OF THE INVENTION

1. Field of the Invention

The present invention relates to a controller.

2. Description of the Related Art

When a storage device such as a Hard Disk Drive (HDD) used in a host device is replaced with a semiconductor storage device such as a flash memory, for example, the data stored in the HDD may be copied onto the flash memory. In the case where the HDD has a bad sector, the data that has been read from the sector address indicating the storage position of the bad sector is read as unrecoverable erroneous data (see, for example, JP-A 2005-293119 (KOKAI)). Accordingly, after the data has been copied onto the flash memory, when an access is to be made to the data storage location within the flash memory corresponding to the sector address of the bad sector, some measures need to be taken because the access is an access to the bad sector.

One method may be, for example, to register, into a table, a corresponding relationship between bad sectors and data storage locations within the flash memory so that, when an access is to be made to the flash memory, it is judged, for each access, whether the storage location to be accessed corresponds to a bad sector by referring to the table. An HDD has, however, a low possibility of having bad sectors. Accordingly, the possibility for the accessed storage location to correspond to a bad sector is also low. Considering these circumstances, it is inefficient to judge, for each access, whether the storage location corresponds to a bad sector by referring to the table. For this reason, there has been a demand for an improvement on the overall processing performance in semiconductor storage devices with regard to accesses made to special sectors such as bad sectors.

SUMMARY OF THE INVENTION

According to an aspect of the present invention, a controller includes a first storing unit that stores therein a set of sector addresses each indicating a logical storage position within a storage area of a nonvolatile memory; page addresses indicating, in units of pages, physical storage positions within the storage area of the nonvolatile memory; and pieces of management information each indicating whether one or more special sectors each being either a bad sector or a trimmed sector trimmed by a TRIM command are present in a corresponding one of the pages, while a set of sector addresses each indicating a logical storage position within a storage area of a nonvolatile memory, the page address, and the pieces of management information are associated with each other; a first judging unit that, in a case where an access to a specified sector address has been requested, refers to a corresponding one of the pieces of management information and judges whether one or more special sectors are present in a page identified by the page address corresponding to the specified sector address; a generating unit that, in a case where one or more special sectors are present in the page, generates predetermined response data; and a controlling unit that, in a case where no special sector is present in the page, accesses the storage position in the nonvolatile memory that corresponds to the specified sector address.

DETAILED DESCRIPTION OF THE INVENTION

In the following sections, exemplary embodiments of a controller according to the present invention will be explained in detail with reference to the accompanying drawings.

Figure 1:
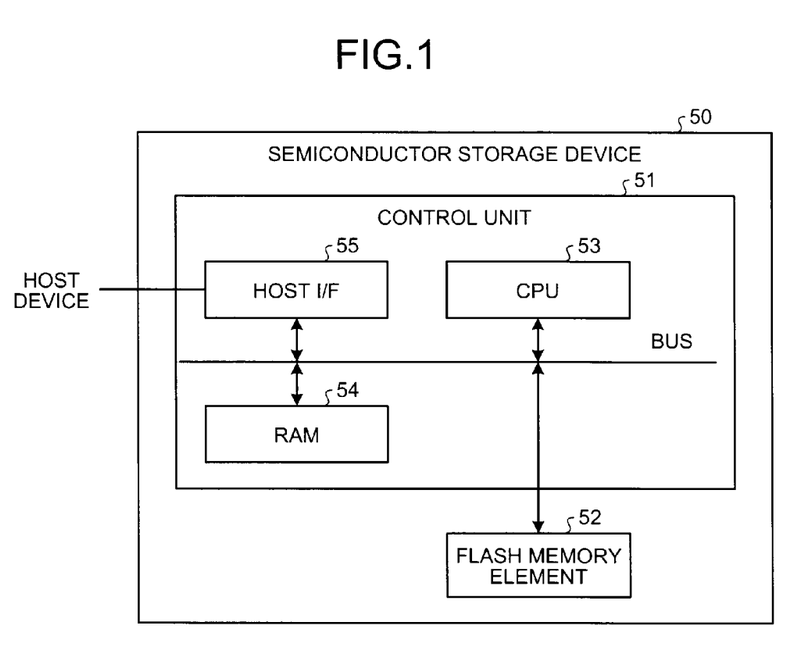
FIG. 1 is a drawing showing an exemplary hardware configuration of a semiconductor storage device.

First, a hardware configuration of a semiconductor storage device will be explained with reference to FIG. 1. A semiconductor storage device 50 according to an embodiment of the present invention includes a control unit 51 serving as a controller and a flash memory element 52. The flash memory element 52 is a storage element used in, for example, a Not-AND (NAND)-type flash memory. The control unit 51 includes a Central Processing Unit (CPU) 53 that controls the entirety of the semiconductor storage device 50 by executing computer programs (hereinafter "programs"); a Random Access Memory (RAM) 54 that stores various types of data and various types of programs therein; a host interface (I/F) 55 that controls communications with a host device, which is a superior device; and a flash memory I/F (not shown) that controls data transfer to and from the flash memory.

In this configuration, the semiconductor storage device 50 communicates with the host device via the host I/F 55 and, in response to a command indicating a request from the host device, stores data transmitted from the host device into the flash memory element 52, transmits data read from the flash memory element 52 to the host device, or registers a sector (hereinafter, a "special sector") that requires special processing. The special processing is performing a process to return data (hereinafter, "response data") of a corresponding response when an access to a special sector has been requested. The details of the response will be explained later. The special sector is, for example, a bad sector or a sector (hereinafter, a "trimmed sector") that has been trimmed by a "TRIM" command. The explanation of the "TRIM" command will be omitted. The "Advanced Technology Attachment (ATA) TRIM", for example, can be found in the document cited below. It should also be noted that the "TRIM" command does not necessarily have to be the "ATA TRIM" command. The "TRIM" command may be a "TRIM" command according to any other standard.
http://www.t13.org/Documents/UploadedDocuments/docs2009/d2015 r1a-ATAATAPI_Command Set_-_2_ACS-2.pdf Interpretation (called "decoding") of each of the commands from the host device is realized when the CPU 53 executes the programs stored in the RAM 54. The commands that are transmitted from the host device include a command requesting that an access should be made so that data can be read or written from or to the flash memory element 52 and a command requesting that a special sector should be registered.

Next, data storage locations will be explained. Within the semiconductor storage device 50, a data storage location is expressed by using an address (hereinafter, a "physical block address") indicating a physical storage position in the storage area of the flash memory element 52. In contrast, in a command issued to the semiconductor storage device 50 by the host device, a data storage location is expressed by using an address (hereinafter, a "logical block address" or a "sector address") indicating a logical storage position that is different from the physical storage position in the storage area of the flash memory element 52.

As for the size of a data storage location, because the host device usually handles data while using 512 bytes as a unit, a sector address is used for specifying each of the storage areas that are in units of 512 bytes. Each of the storage areas that are in units of 512 bytes is called a "sector". In contrast, data is read and written from and to the flash memory element 52 in units that usually have a size obtained by multiplying 512 by a power of 2 (e.g., 2048 bytes or 4096 bytes). Each of the storage areas that are in these units is called a "page".

To each of the pages in the flash memory element 52, an area having consecutive sector addresses is assigned. To translate a sector address into a physical block address in the case where each sector address is expressed by using N bits and where the size of one page is expressed as $512 \times 2^n$ bytes, the corresponding page within the flash memory element 52 is identified by using the upper "N-n" bits of the sector address, whereas the storage position within the page is identified by using the lower n bits. In other words, the upper "N-n" bits of the sector address are a set of sector addresses each indicating a logical storage position within the storage area of the flash memory element 52. The physical block addresses is obtained by combining together an address (hereinafter, a "page address") that indicates, in units of pages, the physical storage position within the flash memory element 52 and is placed in the upper part of the physical block address, with the storage position within the page that is placed in the lower part of the physical block address.

Within the semiconductor storage device 50, the corresponding relationship between a physical block address and a sector address used in a command issued by the host device changes every time data is written into the flash memory element 52. If a certain page is no longer able to store accurate data therein, the sector address is associated with another physical block address. Thus, there is no need to give special treatment to the sector as a bad sector.

However, in the situation where a storage device such as an HDD used in the host device is to be replaced with the semiconductor storage device 50, all the contents of the HDD are copied onto the semiconductor storage device 50. In this situation, if the HDD has a bad sector, the bad sector is also copied. Thus, when an access is to be made to the physical block address in the flash memory element 52 corresponding to the sector address of the bad sector in the HDD, an error should be returned because the access is an access to the bad sector. Accordingly, when having received, from the host device, a command requesting that a bad sector should be registered, the semiconductor storage device 50 registers the bad sector in response to the command. Also, when having received, from the host device, a command requesting that an access should be made to the registered bad sector, the semiconductor storage device 50 returns response data indicating an error to the host device. As explained above, bad sectors require special processing. Similarly, trimmed sectors also require special processing. This function is realized by the control unit 51 included in the semiconductor storage device 50. In the following sections, a functional configuration of the control unit 51 will be explained more specifically.

Figure 2:
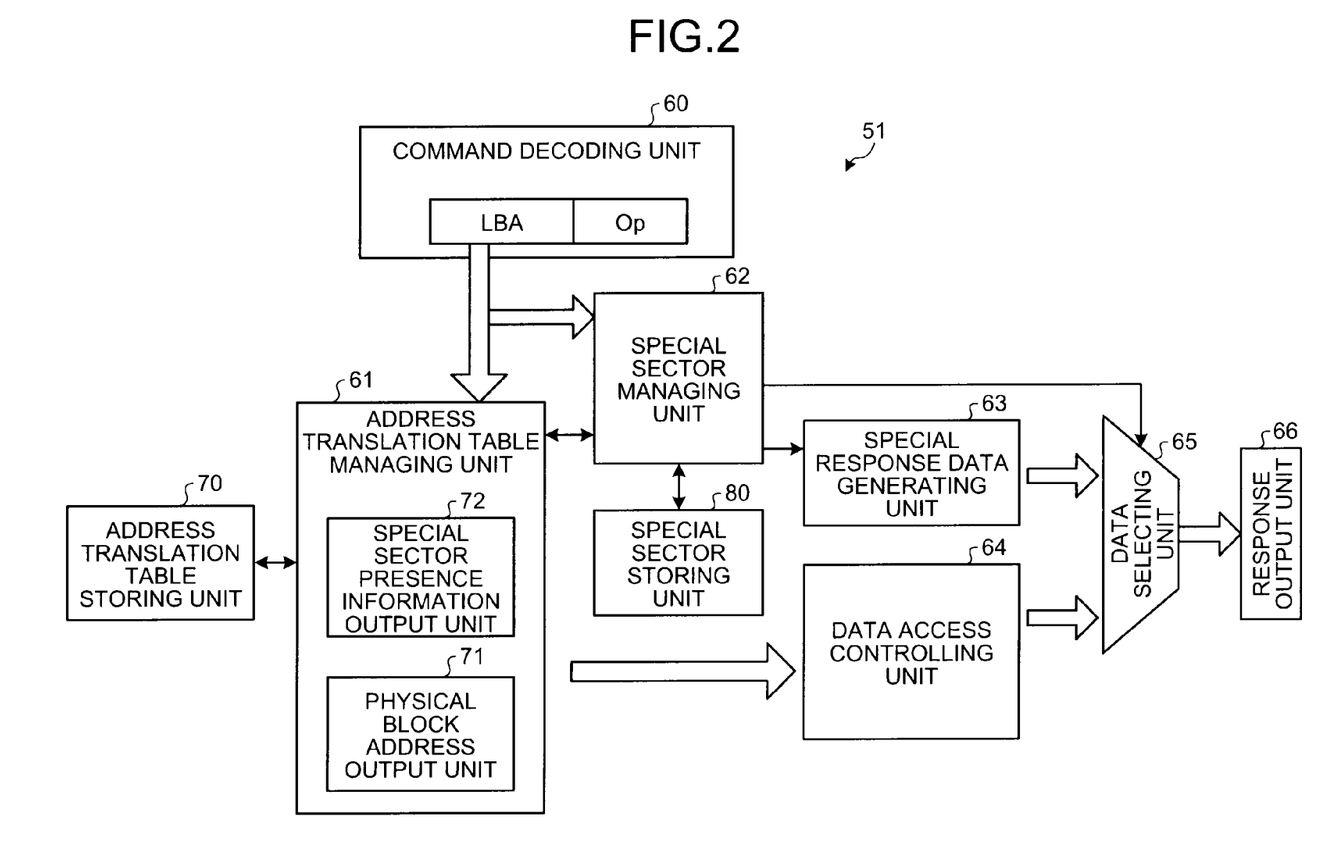
FIG. 2 is a drawing showing an exemplary functional configuration of a control unit.

FIG. 2 is a drawing showing an exemplary functional configuration of the control unit 51. The control unit 51 includes a command decoding unit 60, an address translation table managing unit 61, a special sector managing unit 62, a special response data generating unit 63, a data access controlling unit 64, a data selecting unit 65, and a response output unit 66. The control unit 51 also includes an address translation table storing unit 70 and a special sector storing unit 80. These storing units may be stored in, for example, the RAM 54. At least one of these storing units may be stored into the flash memory element 52 regularly or at arbitrary times, for the purpose of backing up the stored data.

The command decoding unit 60 decodes a command that has been received from the host device via the host I/F 55. In the case where the command transmitted from the host device requests that data should be read, the command contains, as an argument, the sector address of the target of the reading process. In the case where the command requests that data should be written, the command contains, as arguments, the data that is the target of the writing process as well as the sector address of the target of the writing process. In the case where the command requests that a special sector should be registered, the command contains, as an argument, the sector address of the target of the registering process. In the case where the command requests that one or more trimmed sectors, which are each a special sector, should be registered, the command further contains, as an argument, the number of sectors. As explained above, in the command, the sector that is the target of the access or the target of the registering process is specified by the sector address. The command decoding unit 60 decodes such a command and extracts one or more of the following, as necessary, in response to the command: the sector address of the target of the access, which is the target of the reading process or the target of the writing process; the sector address of the target of the registering process; the number of sectors; and the data that is the target of the writing process.

The address translation table managing unit 61 includes a physical block address output unit 71 and a special sector presence information output unit 72. The address translation table managing unit 61 manages the address translation table storing unit 70 by controlling storing and deleting of entries into and from the address translation table storing unit 70 and controlling accesses to the entries. The address translation table storing unit 70 stores therein a corresponding relationship between the upper "N-n" bits of the sector address and page addresses as well as management information that is associated therewith. The management information is information indicating whether one or more special sectors are present among the sectors contained in each of the pages.

Figure 3:
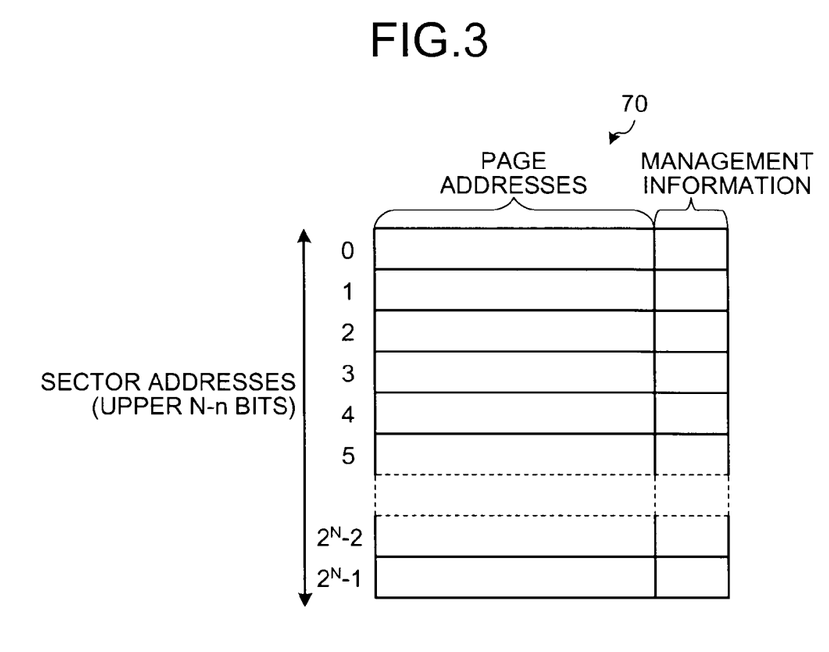
FIG. 3 is a drawing showing an exemplary data structure of an address translation table storing unit.

FIG. 3 is a drawing showing an exemplary data structure of the address translation table storing unit 70. In the address translation table storing unit 70 shown in FIG. 3, pieces of management information are stored in units of page addresses, i.e., in units of pages.

Each of the pieces of management information may be a piece of information having one bit and indicating only whether any special sector is present. Alternatively, each of the pieces of management information may be a piece of information having a plurality of bits so as to be able to distinguish whether the type of the special sector is a bad sector or a trimmed sector. Further alternatively, each of the pieces of management information may include a parity bit for the corresponding entry in the address translation table storing unit 70, so that the parity bit can be used for error detection. In the case where it is distinguishable whether the special sector is a bad sector or a trimmed sector, it is further possible to distinguish whether all the sectors in one page are trimmed sectors or only some of the sectors are trimmed sectors while the rest of the sectors are normal sectors. Specifically, on an assumption that, for example, each of the pieces of management information is a piece of information having 2 bits, the management information may be configured in the following manner: when the value of a piece of management information is "00", it means that no special sector is present; when the value is "01", it means that one or more bad sectors, which are each a special sector, are present; when the value is "10", it means that one ore more trimmed sectors, which are each a special sector, are present in a part of the page; and when the value is "11", it means that trimmed sectors, which are each a special sector, are present in the entirety of the page. In the following sections, examples in which these four values are used as the management information will be explained.

In the case where the command that has been transmitted from the host device requests that data should be read or data should be written, the address translation table managing unit 61 refers to the address translation table storing unit 70 by using the upper "N-n" bits of the sector address extracted by the command decoding unit 60 as a key and obtains the page address and the piece of management information corresponding to the key. The physical block address output unit 71 outputs a physical block address obtained by combining the page address with the lower n bits of the sector address, which has been extracted by the command decoding unit 60, to the data access controlling unit 64. In the case where a piece of management information indicates that one or more special sectors are present, the special sector presence information output unit 72 outputs the piece of management information to the special sector managing unit 62. In the case where the command that has been transmitted from the host device requests that a special sector should be registered, the address translation table managing unit 61 refers to the address translation table storing unit 70 by using the upper "N-n" bits of the sector address extracted by the command decoding unit 60 as a key and updates the management information as required by writing a value, as necessary, as the piece of management information for the page address that is the entry corresponding to the key.

Figure 4:
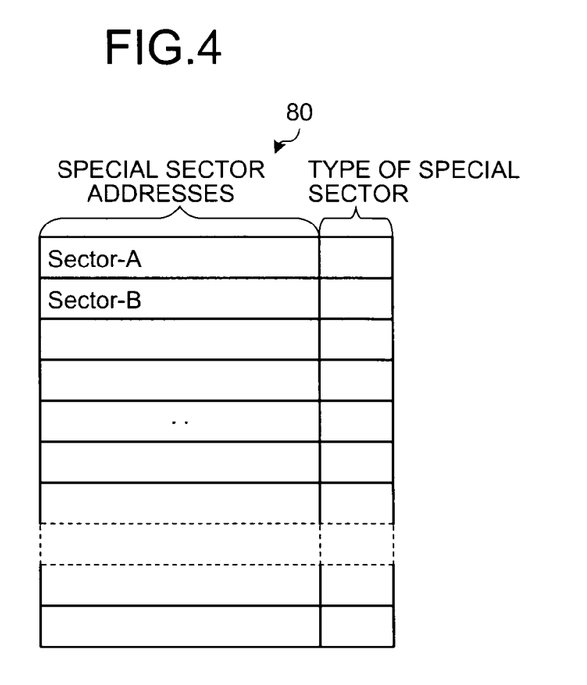
FIG. 4 is a drawing showing an exemplary data structure of a special sector storing unit.

The special sector managing unit 62 manages the special sector storing unit 80 by controlling storing and deleting of entries into and from the special sector storing unit 80 and controlling accesses to the entries. The special sector storing unit 80 stores therein sector addresses of special sectors (hereinafter, "special sector addresses") and types of the special sectors while associating them with each other. FIG. 4 is a drawing showing an exemplary data structure of the special sector storing unit 80. In the example shown in FIG. 4, the special sector addresses are arranged in the order in which the special sector addresses are stored in the special sector storing unit 80. Alternatively, the special sector addresses may be stored while being sorted in the order of the sector addresses. In the case where there is a high possibility that entries are frequently registered into or deleted from the special sector storing unit 80 for sectors, e.g., trimmed sectors, the special sector addresses may be stored in the form of a list structure or a tree structure.

In the case where the command that has been transmitted from the host device requests that data should be read or data should be written, when the special sector managing unit 62 has received the piece of management information that has been output from the special sector presence information output unit 72, the special sector managing unit 62 judges whether the sector address extracted by the command decoding unit 60 is stored in the special sector storing unit 80 as a special sector address. The special sector managing unit 62 thus judges whether the sector address extracted by the command decoding unit 60 is an address of a special sector. The special sector managing unit 62 does not perform this judging process if no piece of management information has been output from the special sector presence information output unit 72 to the special sector managing unit 62. In other words, in the case where there is a high possibility that the sector address extracted by the command decoding unit 60 may be a special sector address, the special sector managing unit 62 judges whether the sector address is a special sector address. In the case where there is no possibility that the sector address is a special sector address, the special sector managing unit 62 does not perform the judging process. As a result, it is possible to perform the judging process efficiently. In the case where the special sector managing unit 62 has judged that the sector address extracted by the command decoding unit 60 is a special sector address, the special sector managing unit 62 outputs the piece of management information that has been output from the special sector presence information output unit 72 to the special response data generating unit 63.

In the case where the command that has been transmitted from the host device requests that a special sector should be registered, the special sector managing unit 62 takes the sector address extracted by the command decoding unit 60 and stores the sector address and the type of the special sector into the special sector storing unit 80 while associating them with each other. In the case where registering a trimmed sector in response to a command will result in a transition from a situation in which trimmed sectors are present in a part of a page to a situation in which trimmed sectors are present in the entirety of the page, the special sector managing unit 62 deletes all the sector addresses corresponding to the page that are stored in the special sector storing unit 80.

In the case where the special sector managing unit 62 has judged that the sector address extracted by the command decoding unit 60 is a special sector address, the special response data generating unit 63 generates response data corresponding to the type of the special sector. Specifically, in the case where the information showing the type of the special sector and being stored in the special sector storing unit 80 in association with the sector address indicates that the special sector is a bad sector, the special response data generating unit 63 generates response data indicating an error. In contrast, in the case where the type of the special sector is indicated as a trimmed sector, the special response data generating unit 63 generates response data defined by a standard related to treating ATA TRIM commands. The response data may be, for example, a specific constant number (e.g., "0") or a random number. Alternatively, the data stored at the physical block address corresponding to the sector address extracted by the command decoding unit 60 may be used as the response data. In this case, the special response data generating unit 63 accesses the flash memory element 52 and reads the data stored at the physical block address.

The data access controlling unit 64 accesses the flash memory element 52 and reads the data stored at the block address that has been output by the physical block address output unit 71 or writes the data that has been extracted by the command decoding unit 60 and is the target of the writing process into the block address that has been output by the physical block address output unit 71.

The data selecting unit 65 outputs the data that has been read by the data access controlling unit 64 or the response data that has been generated by the special response data generating unit 63 to the response output unit 66. In the case where the type of the special sector is indicated as a trimmed sector, the special response data generating unit 63 may select, as the response data, response data defined by the standard mentioned above or the data that has been read by accessing the flash memory element 52 and may output the selected data to the response output unit 66.

In the case where the command that has been transmitted from the host device requests that data should be read, the response output unit 66 transmits the response data that has been output by the data selecting unit 65 to the host device via the host I/F 55. In the case where the command that has been transmitted from the host device requests that data should be written, and also, the writing process of the data has been completed, the response output unit 66 transmits response data indicating that the writing process of the data has been completed to the host device via the host I/F 55. In the case where the command that has been transmitted from the host device requests that a special sector should be registered, and also, the registering process of the special sector has been completed, the response output unit 66 transmits response data indicating that the registering process of the special sector has been completed to the host device via the host I/F 55.

In the case where the command that has been received from the host device requests that a special sector should be registered, the control unit 51 writes a value as the piece of management information for the page address corresponding to the sector address that has been extracted from the command or stores, in accordance with the type of the special sector, the sector address and the type of the special sector into the special sector storing unit 80 while associating them with each other. In the case where the command that has been received from the host device requests that data should be read, the control unit 51 generates the predetermined response data if the sector address extracted from the command is a special sector address. Otherwise, the control unit 51 reads the data from the flash memory element 52 in accordance with the command. In the case where the command that has been received from the host device requests that data should be written, the control unit 51 generates response data indicating an error if the sector address extracted from the command is a special sector address and the type of the special sector is indicated as a bad sector. If the sector address extracted from the command is a special sector address and the type of the special sector is indicated as a trimmed sector, the control unit 51 writes the data into the storage position within the flash memory element 52 corresponding to the sector address in response to the command and also changes the treatment for the sector address to that of the sector address of a normal sector. In contrast, if the sector address extracted from the command is not a special sector address, the control unit 51 writes the data into the flash memory element 52 in accordance with the command.

Figure 5:
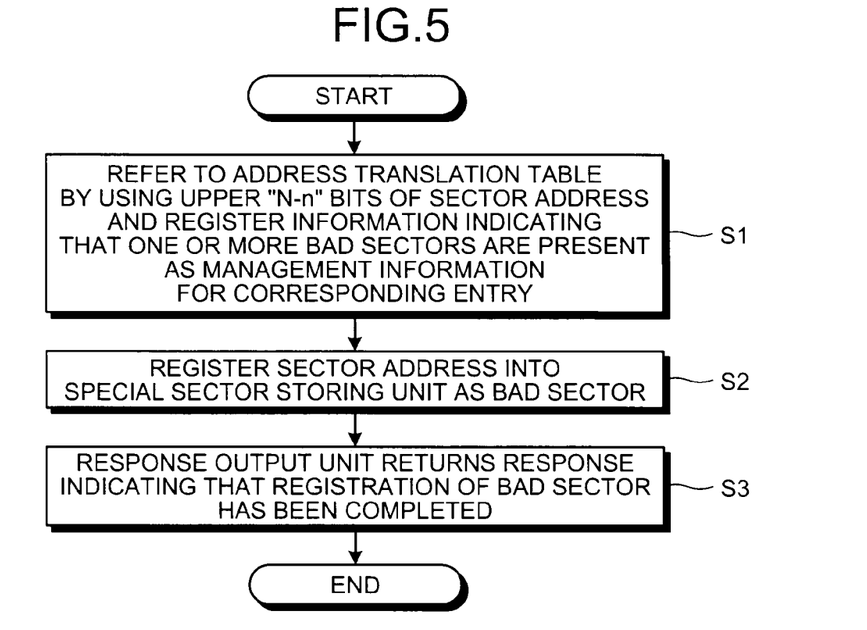
FIG. 5 is a flowchart showing a procedure in a process to newly register a bad sector.

Next, a procedure in processes performed by the semiconductor storage device 50 according to the present embodiment will be explained. First, a procedure in a process to newly register a bad sector will be explained with reference to FIG. 5. By using the function of the command decoding unit 60, the control unit 51 included in the semiconductor storage device 50 decodes a command that has been received from the host device. In the case where the command requests that a bad sector should be registered, the control unit 51 extracts the sector address that is contained in the command as an argument and is the target of the registering process. After that, by using the function of the address translation table managing unit 61, the control unit 51 refers to the address translation table by using the upper "N-n" bits of the extracted sector address as a key and writes "01", which indicates that one or more bad sectors, which are each a special sector, are present, as the piece of management information for the page address that is the entry corresponding to the key (step S1). Subsequently, by using the function of the special sector managing unit 62, the control unit 51 newly registers the bad sector by storing the sector address extracted from the command and the type of the special sector (i.e., indicating that the special sector is a bad sector) into the special sector storing unit 80 while associating them with each other (step S2). In this case, the control unit 51 may store sector addresses in the order in which registrations thereof have been requested if the estimated number of sector addresses to be registered is small. Alternatively, the sector addresses may be sorted in the order of the sector addresses. After that, by using the function of the response output unit 66, the control unit 51 transmits a response indicating that the registering process of the bad sector has been completed to the host device (step S3).

Figure 6:
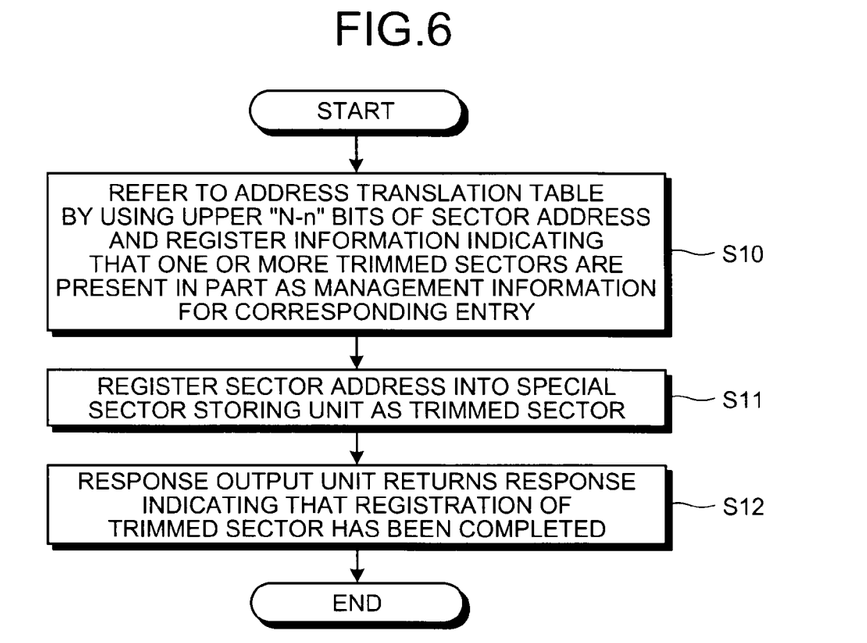
FIG. 6 is a flowchart showing a procedure in a process to newly register a trimmed sector.

Next, a procedure in a process to newly register one or more trimmed sectors will be explained. First, a procedure in a process to newly register a trimmed sector (i.e., when the number of sectors is "1") will be explained with reference to FIG. 6. By using the function of the command decoding unit 60, the control unit 51 decodes a command that has been received from the host device. In the case where the command requests that one or more trimmed sectors should be registered, the control unit 51 extracts the sector address that is the target of the registering process and the number of sectors, each of which is contained in the command as an argument. In the case where the indicated number of sectors is "1", the control unit 51 refers to the address translation table by using the upper "N-n" bits of the sector address extracted from the command as a key and writes "10", which indicates that one or more trimmed sectors, which are each a special sector, are present in a part of the page, as the piece of management information for the page address corresponding to the key (step S10). After that, by using the function of the special sector managing unit 62, the control unit 51 newly registers the trimmed sector by storing the sector address extracted from the command and the type of the special sector (i.e., indicating that the special sector is a trimmed sector) into the special sector storing unit 80 while associating them with each other (step S11). After that, by using the function of the response output unit 66, the control unit 51 transmits a response indicating that the registering process of the trimmed sector has been completed to the host device (step S12).

Figure 7:
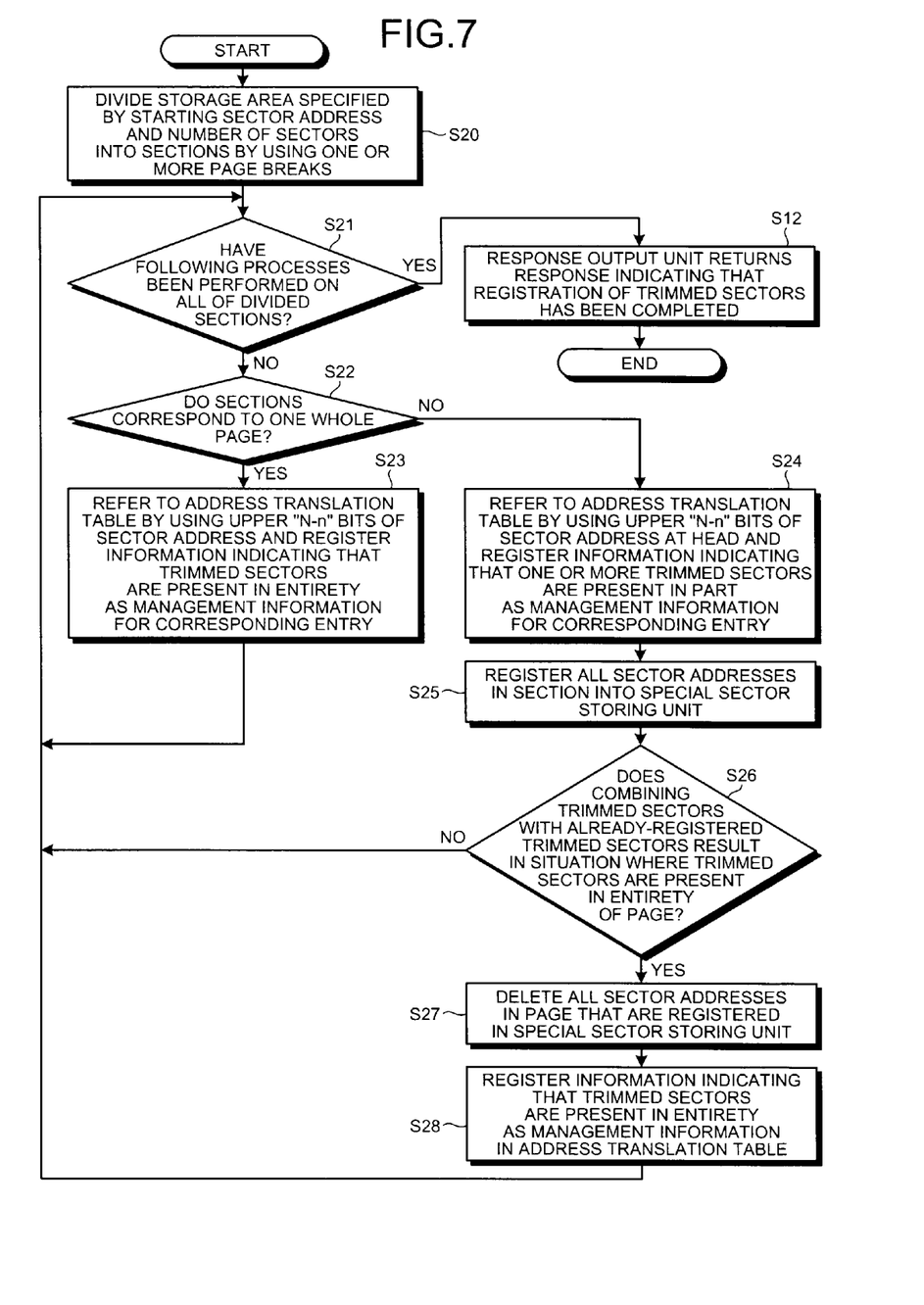
FIG. 7 is a flowchart showing a procedure in a process to newly register trimmed sectors.

Next, a procedure in a process to newly register trimmed sectors (i.e., when the number of sectors is "2" or larger) will be explained with reference to FIG. 7. By using the function of the command decoding unit 60, the control unit 51 decodes a command that has been received from the host device. In the case where the command requests that one or more trimmed sectors should be registered, the control unit 51 extracts the sector address that is the target of the registering process and the number of sectors, each of which is contained in the command as an argument. In the case where the indicated number of sectors is "2" or larger, a storage area that starts from the extracted sector address and has the length corresponding to the number of sectors indicated in the command is the target area for the registering process. In this case, the control unit 51 divides the storage area into sections by using one or more page breaks (step S20) and performs the process described below for each of the sections obtained as a result of the diving process. At step S21, the control unit 51 judges whether all the sections have been processed (step S21). In the case where the result of the judging process is in the negative (step S21: No), the control unit 51 selects the unprocessed sections as a processing target and judges whether the sections correspond to one whole page (step S22). In the case where the result of the judging process is in the affirmative (step S22: Yes), the control unit 51 refers to the address translation table by using the upper "N-n" bits of the sector address extracted from the command as a key and writes "11", which indicates that trimmed sectors are present in the entirety of the page, as the piece of management information for the page address corresponding to the key (step S23). After that, the process returns to step S21.

In contrast, in the case where the result of the judging process at step S22 is in the negative (step S22: No), the control unit 51 refers to the address translation table storing unit 70 by using the upper "N-n" bits of the sector address at the head of the section as a key and writes "10", which indicates that one or more trimmed sectors are present in a part of the page, as the piece of management information for the page address corresponding to the key (step S24). After that, by using the function of the special sector managing unit 62, the control unit 51 newly registers the trimmed sectors by storing, for each of all the sector addresses in the section, the sector address and the type of the special sector (i.e., indicating that the special sectors are each a trimmed sector) into the special sector storing unit 80, while associating them with each other (step S25). Subsequently, the control unit 51 judges, with regard to the page containing the section, whether combining the sector addresses that have already been stored in the special sector storing unit 80 with the sector addresses that have newly been stored at step S25 will result in a situation where trimmed sectors are present in the entirety of the page (step S26). In the case where the result of the judging process is in the affirmative (step S26: Yes), the control unit 51 deletes all the sector addresses corresponding to the page that are stored in the special sector storing unit 80 (step S27). After that, with regard to the page, the control unit 51 refers to the address translation table storing unit 70 by using the page address as a key and writes "11", which indicates that trimmed sectors are present in the entirety of the page, as the piece of management information for the page address corresponding to the key (step S28). After that, the process returns to step S21. Also, in the case where the result of the judging process at step S26 is in the negative (step S26: No), the process returns to step S21.

When the processes described above have been performed on all the sections so that the result of the judging process at step S21 is in the affirmative (step S21: Yes), the control unit 51 transmits a response indicating that the registering process of the trimmed sectors has been completed to the host device, by using the function of the response output unit 66 (step S12).

As explained above, in the case where the storage area, of which the starting position is the sector address extracted from the command and of which the length is the number of sectors indicated in the command, contains a plurality of pages, the control unit 51 writes "11", which indicates that trimmed sectors are present in the entirety of the page, as the pieces of management information for the corresponding entries in the address translation table storing unit 70 with regard to each of all the pages except the first page and the last page. As for the first page and the last page, the control unit 51 judges whether trimmed sectors are present in the entirety of the page or one or more trimmed sectors are present in a part of the page and writes values as the pieces of management information in the corresponding entries in the address translation table storing unit 70 in accordance with the results of the judging process.

In the case where it is possible to judge whether trimmed sectors are present in the entirety of the page or one or more trimmed sectors are present in a part of the page by referring to the corresponding piece of management information stored in the address translation table storing unit 70, and if trimmed sectors are present in the entirety of the page, it is possible to determine that the sector address extracted from the command is a special sector address only by referring to the piece of management information. Thus, in this case, the control unit 51 is able to omit the process to register the trimmed sector into the special sector storing unit 80. In contrast, in the case where trimmed sectors are present in a part of the page, the control unit 51 unifies the registration of the trimmed sectors regarding the page. This unification is performed considering the situation where the sectors that are on the outside of the area of which the registration has been requested by the command have already been registered as trimmed sectors with regard to the page.

Figure 8:
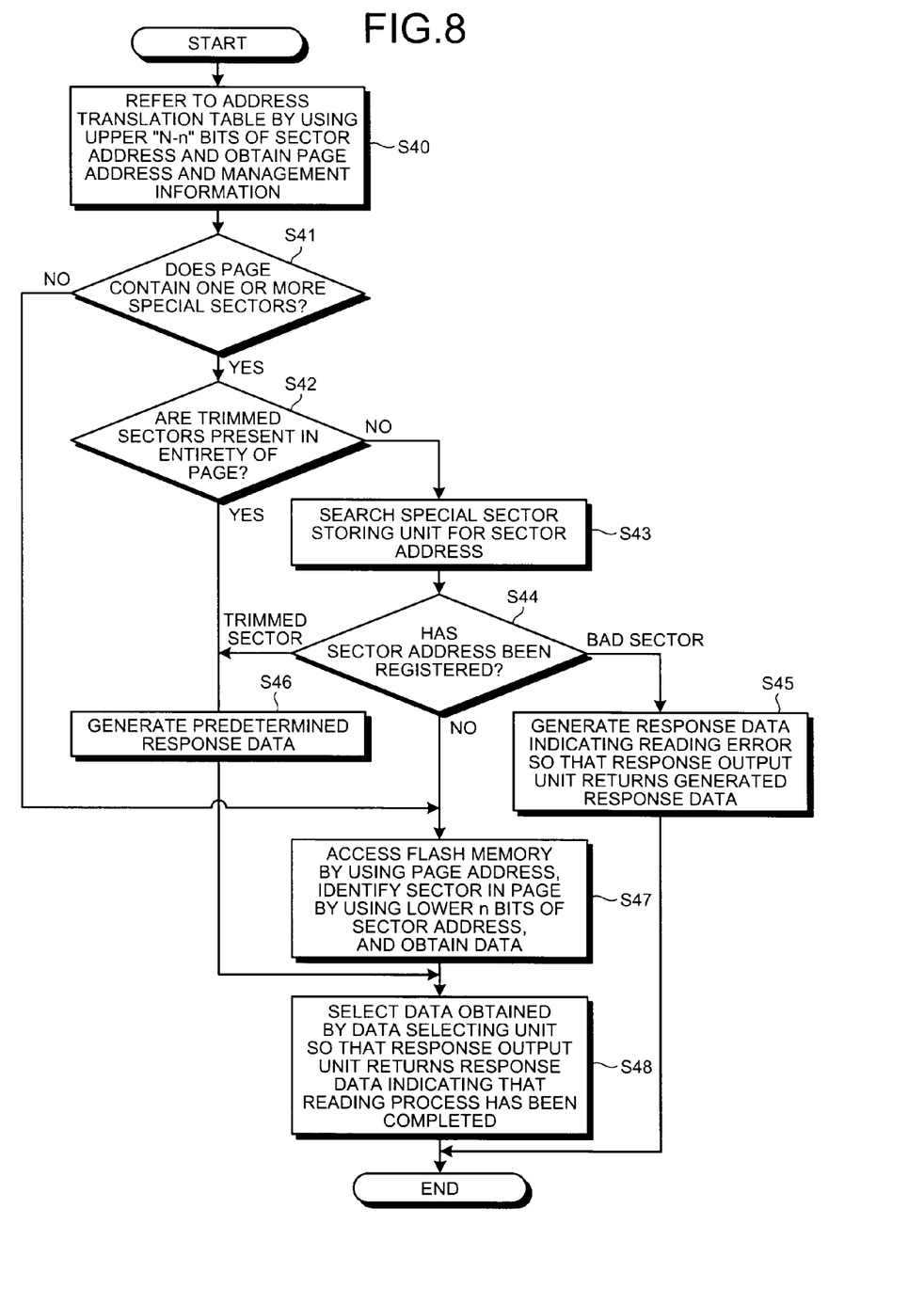
FIG. 8 is a flowchart showing a procedure in a process to read data from a flash memory element.

Next, a procedure in a process to read data from the flash memory element 52 will be explained with reference to FIG. 8. By using the function of the command decoding unit 60, the control unit 51 decodes the command that has been received from the host device. In the case where the command requests that data should be read, the control unit 51 extracts the sector address that is contained in the command as an argument and is the target of the reading process. Subsequently, by using the function of the address translation table managing unit 61, the control unit 51 refers to the address translation table by using the upper "N-n" bits of the sector address extracted from the command as a key and obtains the page address and the piece of management information corresponding to the key (step S40). After that, by using the extracted piece of management information, the control unit 51 judges whether one or more special sectors are present in the page (step S41). Specifically, in the case where the value of the piece of management information is "00", the control unit 51 judges that no special sector is present in the page. In contrast, in the case where the value of the piece of management information is "01", "10", or "11", the control unit 51 judges that one or more special sectors are present in the page. In the case where the control unit 51 has judged that no special sector is present in the page (step S41: No), the control unit 51 accesses, by using the function of the data access controlling unit 64, the page within the flash memory element 52 that is identified by the page address obtained at step S40, identifies the storage position within the page by using the lower n bits of the sector address that has been extracted from the command, and reads the data from the storage position (step S47). In this manner, at step S47, the controlling unit reads the data from the physical block address corresponding to the sector address that has been extracted from the command. The process then proceeds to step S48.

In contrast, in the case where the control unit 51 has judged that one or more special sectors are present in the page (step S41: Yes), the control unit 51 judges whether trimmed sectors are present in the entirety of the page (step S42). Specifically, the control unit 51 judges whether the value of the piece of management information is "10". In the case where the result of the judging process is in the negative (step S42: No), the control unit 51 searches, by using the function of the special sector managing unit 62, the special sector storing unit 80 for the sector address that has been extracted from the command (step S43) and judges whether the sector address is stored in the special sector storing unit 80 (step S44). In the case where the result of the judging process is in the negative (step S44: No), the process proceeds to step S47. In contrast, in the case where the result of the judging process at step S44 indicates that the sector address extracted from the command is stored in the special sector storing unit 80, and also, the information showing the type of the special sector and being stored in association with the sector address indicates that the special sector is a bad sector, the control unit 51 generates response data indicating an error by using the function of the special response data generating unit 63 and transmits the generated response data to the host device by using the function of the response output unit 66 (step S45).

In contrast, in the case where the result of the judging process at step S44 indicates that the sector address extracted from the command is stored in the special sector storing unit 80, and also, the information showing the type of the special sector and being stored in association with the sector address indicates that the special sector is a trimmed sector, the process proceeds to step S46. Also, in the case where the result of the judging process at step S42 is in the affirmative (step S42: Yes), the process proceeds to step S46. At step S46, by using the function of the special response data generating unit 63, the control unit 51 generates response data that is defined in the standard mentioned above or accesses the flash memory element 52 and reads the data in the same manner as described at step S47. After that, the process proceeds to step S48. At step S48, the control unit 51 selects, by using the function of the data selecting unit 65, the response data that is defined in the standard mentioned above or the data that has been read from the flash memory element 52 as response data and transmits, by using the function of the response output unit 66, the response data to the host device (step S48).

Figure 9:
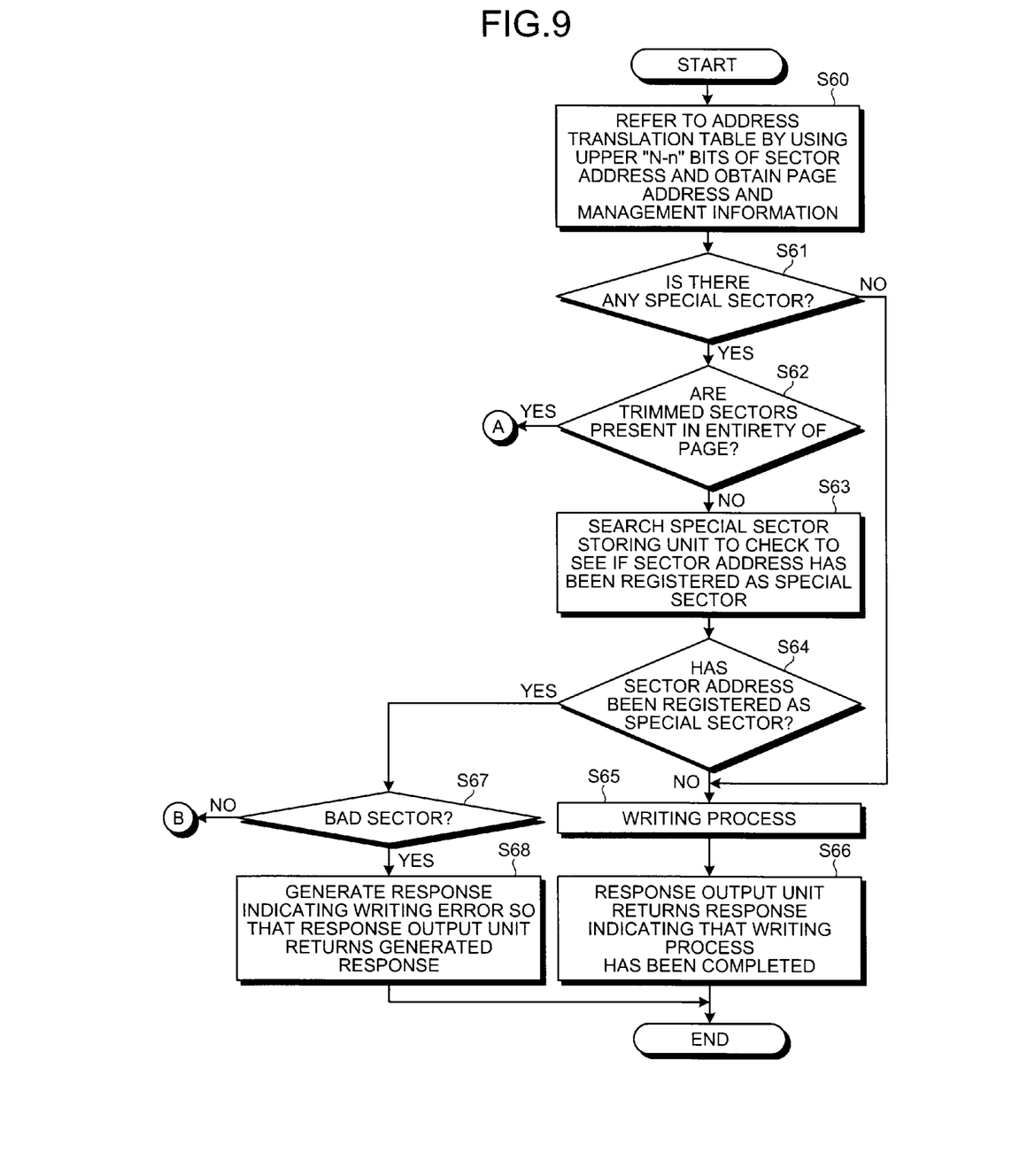
FIG. 9 is a flowchart showing a procedure in a process to write data into the flash memory element.
Figure 10:
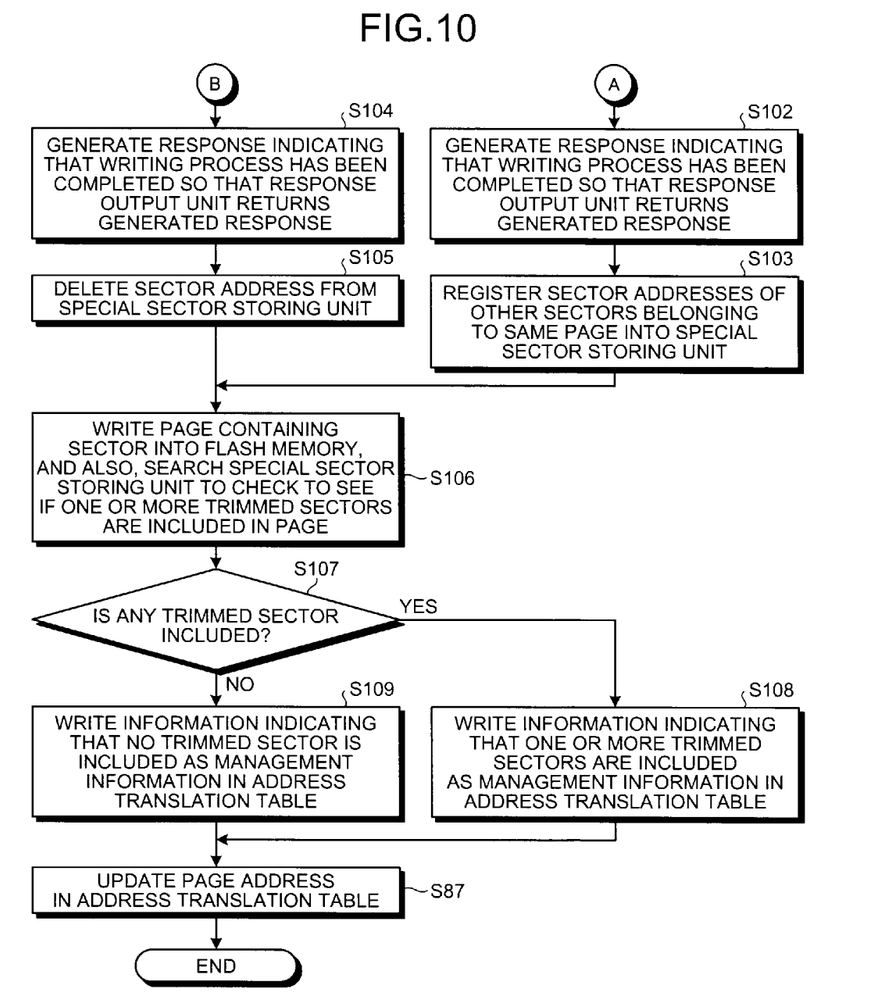
FIG. 10 is another flowchart showing the procedure in the process to write data into the flash memory element.

Next, a procedure in a process to write data into the flash memory element 52 will be explained, with reference to FIGS. 9 and 10. By using the function of the command decoding unit 60, the control unit 51 decodes the command that has been received from the host device. In the case where the command requests that data should be written, the control unit 51 extracts the sector address that is the target of the writing process and the data that is the target of the writing process, each of which is contained in the command as an argument. Subsequently, by using the function of the address translation table managing unit 61, the control unit 51 refers to the address translation table by using the upper "N-n" bits of the sector address extracted from the command as a key and obtains the page address and the piece of management information that are stored in association with the key (step S60). After that, by using the extracted piece of management information, the control unit 51 judges whether one or more special sectors are present in the page (step S61). Specifically, in the case where the value of the piece of management information is "00", the control unit 51 judges that no special sector is present in the page. In contrast, in the case where the value of the piece of management information is "01", "10", or "11", the control unit 51 judges that one or more special sectors are present in the page. In the case where the control unit 51 has judged that no special sector is present in the page (step S61: No), the control unit 51 accesses, by using the function of the data access controlling unit 64, the page within the flash memory element 52 that is identified by the page address obtained at step S60, identifies the storage position within the page by using the lower n bits of the sector address that has been extracted from the command, and writes the data that is the target of the writing process and has been extracted from the command into the storage position (step S65). It should be noted that the data writing process is performed in units of pages. Accordingly, the control unit 51 rewrites the data in the page identified by the page address obtained at step S60 by temporarily reading the data in the page into a work area of the flash memory element 52 and writing the data that is the target of the writing process and has been extracted from the command at the storage position in the temporarily-read data corresponding to the logical block address obtained by combining the page address with the lower n bits of the sector address that has been extracted from the command. Subsequently, the control unit 51 writes the rewritten data into the flash memory element 52 at the page address. After that, by using the function of the response output unit 66, the control unit 51 transmits response data indicating that the writing process of the data has been completed to the host device (step S66).

In contrast, in the case where the control unit 51 has judged that one or more special sectors are present in the page (step S61: Yes), the control unit 51 judges whether trimmed sectors are present in the entirety of the page (step S62). Specifically, the control unit 51 judges whether the value of the piece of management information is "10". In the case where the result of the judging process is in the negative (step S62: No), the control unit 51 searches, by using the function of the special sector managing unit 62, the special sector storing unit 80 for the sector address that has been extracted from the command (step S63) and judges whether the sector address is stored in the special sector storing unit 80 (step S64). In the case where the result of the judging process is in the negative (step S64: No), the process proceeds to step S65. In contrast, in the case where the result of the judging process at step S64 indicates that the sector address extracted from the command is stored in the special sector storing unit 80 (step S64: Yes), the control unit 51 judges whether the information showing the type of the special sector and being stored in association with the sector address indicates that the special sector is a bad sector (step S67). In the case where the type of the special sector is indicated as a bad sector (step S67: Yes), the control unit 51 generates response data indicating an error by using the function of the special response data generating unit 63 and transmits the generated response data to the host device by using the function of the response output unit 66 (step S68).

In contrast, in the case where the result of the judging process at step S64 indicates that the sector address extracted from the command is stored in the special sector storing unit 80 (step S64: Yes), and also, the result of the judging process at step S67 indicates that the information showing the type of the special sector and being stored in association with the sector address that has been extracted from the command indicates that the special sector is a trimmed sector (step S67: No), the control unit 51 performs the process at step S104. The process at step S104 is the same as the process at step S66. After that, at step S105, the control unit 51 deletes, from the special sector storing unit 80, the sector address that has been extracted from the command. As a result, the sector that was registered as a trimmed sector within the page is now changed to a normal sector. After that, the process proceeds to step S106.

In contrast, in the case where the result of the judging process at step S62 indicates that trimmed sectors are present in the entirety of the page (step S62: Yes), the control unit 51 performs the process at step S102. The process at step S102 is the same as the process at step S66. After that, at step S103, with regard to the sectors within the page, the control unit 51 stores all the sector addresses other than the sector address extracted from the command into the special sector storing unit 80 as special sector addresses, while keeping the sector addresses associated with pieces of information each showing the type of the special sector as a trimmed sector, respectively. As a result, the sector identified by the sector address that has been extracted from the command is now changed to a normal sector, whereas the other sectors within the page except for the sector are now registered as trimmed sectors. After that, the process proceeds to step S106.

At step S106, the control unit 51 writes the data in the same manner as at step S65. In this situation also, the data writing process is performed in units of pages, as described above. After that, the control unit 51 judges whether the other sectors within the page identified by the page address that has been obtained at step S60 include one or more trimmed sectors. Specifically, the control unit 51 judges whether each of the other sector addresses corresponding to the page address is stored in the special sector storing unit 80, and also, the information showing the type of the special sector and being stored in association with each of the other sector addresses indicates that the special sector is a trimmed sector (step S107). In the case where the result of the judging process indicates that the other sectors within the page include no trimmed sector (step S107: No), the control unit 51 writes "00", which indicates that no special sector is present, as the piece of management information for the page address within the address translation table storing unit 70 (step S109). After that, the process proceeds to step S87. At step S87, the control unit 51 updates, as necessary, the corresponding relationship between the upper "N-n" bits of the sector address and the page address in the address translation table storing unit 70. In contrast, in the case where the result of the judging process at step S106 indicates that the other sectors within the page include one or more trimmed sectors (step S107: Yes), the control unit 51 writes "10", which indicates that one or more trimmed sectors are present in a part of the page, as the piece of management information for the page address within the address translation table storing unit 70 (step S108). After that, the process proceeds to step S87.

As explained above, the address translation table stores therein, in units of pages, the pieces of management information each of which indicates whether one or more special sectors are present in the corresponding page. It is then judged whether there is a possibility that the sector corresponding to the sector address to which an access has been requested by a command from the host device may be a special sector, by referring to the corresponding piece of management information. With this arrangement, in the case where the sector has no possibility of being a special sector, it is possible to read or write the data from or to the storage position within the flash memory element 52 corresponding to the sector address, without having to take the trouble of judging whether the sector address is stored in the special sector storing unit 80 as a special sector address. Consequently, it is possible to improve the overall processing performance in the semiconductor storage device.

Furthermore, by changing the sector that has been registered as a trimmed sector to a normal sector through the data writing process, it is possible to improve the storing efficiency of the flash memory element 52.

The present invention is not limited to the exemplary embodiments described above. At the implementation stage of the invention, it is possible to materialize the present invention while applying modifications to the constituent elements thereof without departing from the gist thereof. In addition, it is possible to form various inventions by combining, as necessary, two or more of the constituent elements disclosed in the exemplary embodiments. For example, it is acceptable to omit some of the constituent elements described in the exemplary embodiments. Further, it is acceptable to combine, as necessary, the constituent elements from mutually different ones of the exemplary embodiments. Furthermore, it is acceptable to apply various types of modifications as described below.

In the exemplary embodiments described above, an arrangement is acceptable in which the various types of programs executed by the semiconductor storage device 50 are stored in a computer connected to a network such as the Internet so that the various types of programs are provided as being downloaded via the network. Yet another arrangement is acceptable in which the various types of programs are provided in the form of computer program products as being recorded on a computer-readable recording medium such as a Compact Disk Read-Only Memory (CD-ROM), a flexible disk (FD), a Compact Disk Recordable (CD-R), a Digital Versatile Disk (DVD), or the like, in a file that is in an installable format or in an executable format.

In the exemplary embodiments described above, during the process to write the data into the flash memory element 52, in the case where the sector address that has been extracted from the command is stored as a special sector address in the special sector storing unit 80, and also, the information showing the type of the special sector and being stored in association with the sector address indicates that the special sector is a bad sector, the control unit 51 is configured so as not to perform the data writing process. However, the bad sector only corresponds to a bad sector in, for example, the HDD and is not actually bad within the flash memory element 52. It is therefore possible to properly read and write data from and to the storage position within the flash memory element 52 that corresponds to the sector address. For this reason, another arrangement is acceptable in which the control unit 51 writes the data into the storage position within the flash memory element 52 that corresponds to the sector address in response to the command from the host device, and also, changes the treatment status of the sector address to that of the sector address of a normal sector. As described above, because the data writing process is performed in units of pages, the control unit 51 judges whether the other sectors within the page include one or more bad sectors at the point in time when all the pieces of data to be written that correspond to one page have been ready. In the case where no bad sector is present in the page, the control unit 51 updates the management information by writing "00", which indicates that no special sector is present, as the piece of management information that is stored in the address translation table storing unit 70 in association with the page address of the page. As a result, the sector that was registered as a bad sector in the page is now changed to a normal sector through the data writing process.

Figure 11:
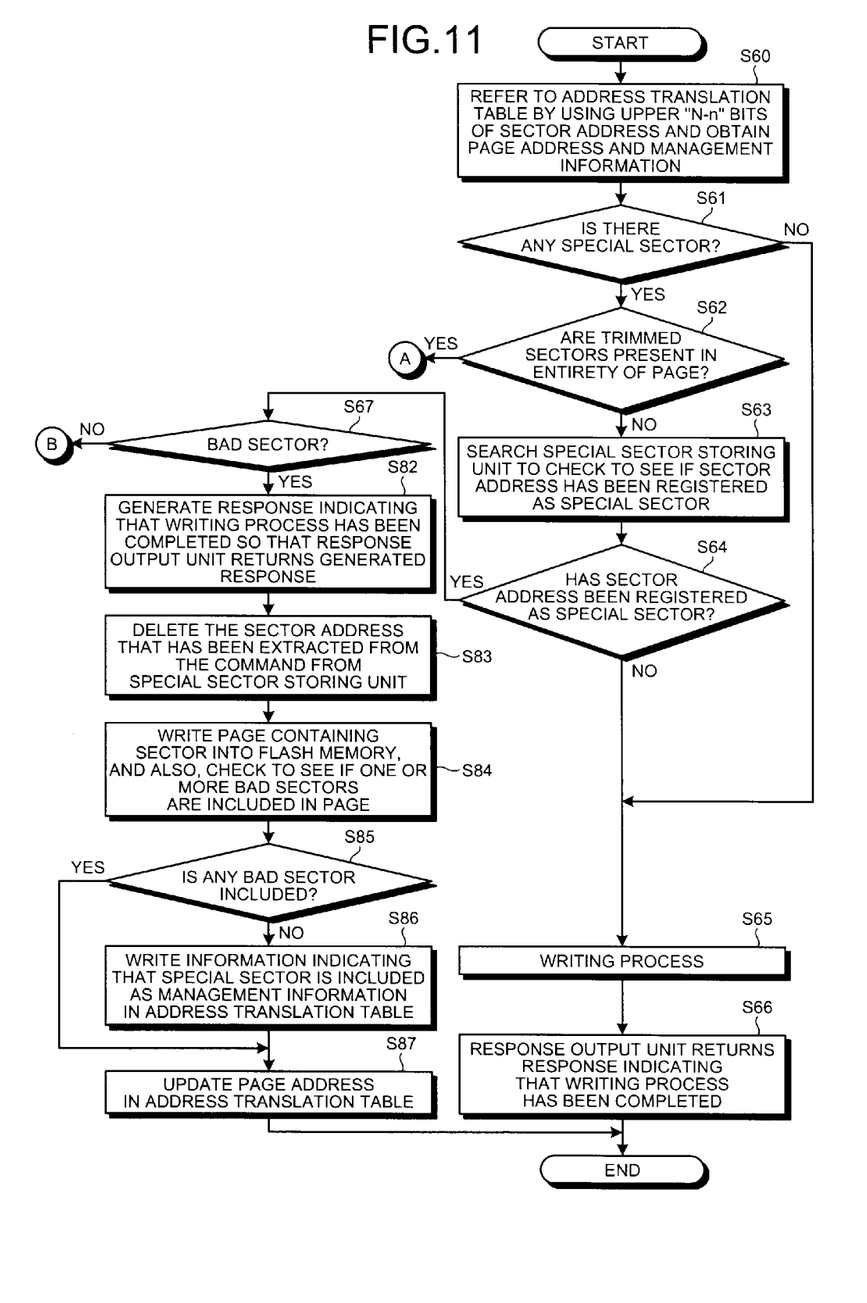
FIG. 11 is yet another flowchart showing the procedure in the process to write data into the flash memory element.

FIG. 11 is a flowchart showing a procedure in the process to write data into the flash memory element 52 in this modification example. The processes performed at steps S60 to S64 and S67 are the same as the processes performed in the embodiment described above. In the case where the result of the judging process at step S67 indicates that the information showing the type of the special sector and being stored in association with the sector address that has been extracted from the command indicates that the special sector is a trimmed sector (step S67: No), the control unit 51 performs the process at step S82. The process at step S82 is the same as the process performed at step S66. After that, at step S83, the control unit 51 deletes the sector address that has been extracted from the command from the special sector storing unit 80. As a result, the sector that was registered as a bad sector in the page is now changed to a normal sector. Subsequently, the control unit 51 performs the process to write the data in the same manner as at step S65. In this situation also, as described above, the control unit 51 performs the data writing process in units of pages. After that, the control unit 51 judges whether the other sectors in the page identified by the page address that has been obtained at step S60 include one or more bad sectors (step S84). Specifically, the control unit 51 judges whether each of the other sector addresses corresponding to the page address is stored in the special sector storing unit 80, and also, the information showing the type of special sector and being stored in association with each of the other sector addresses indicates that the special sector is a bad sector. In the case where the control unit 51 has judged, as a result of the judging process, that the other sectors include no bad sector (step S85: No), the control unit 51 writes "00", which indicates that no special sector is present, as the piece of management information stored in the address translation table storing unit 70 in association with the page address (step S86). After that, the process proceeds to step S87. In contrast, in the case where the control unit 51 has judged, as a result of the judging process at step S84, that the other sectors in the page include one or more bad sectors (step S85: Yes), the process proceeds to step S87. The process at step S87 is substantially the same as the process explained with reference to FIG. 10.

As explained above, by changing the sector that has been registered as a bad sector to a normal sector through the data writing process, it is possible to improve the storing efficiency of the flash memory element 52.

In the embodiment described above, in the case where trimmed sectors are present in the entirety of the page, the special sector storing unit 80 is configured so as not to store therein any of the sector addresses corresponding to the page address. However, the present invention is not limited to this example. Another arrangement is acceptable in which the special sector storing unit 80 is configured so as to store therein all the sector address corresponding to the page address.

Figure 12:
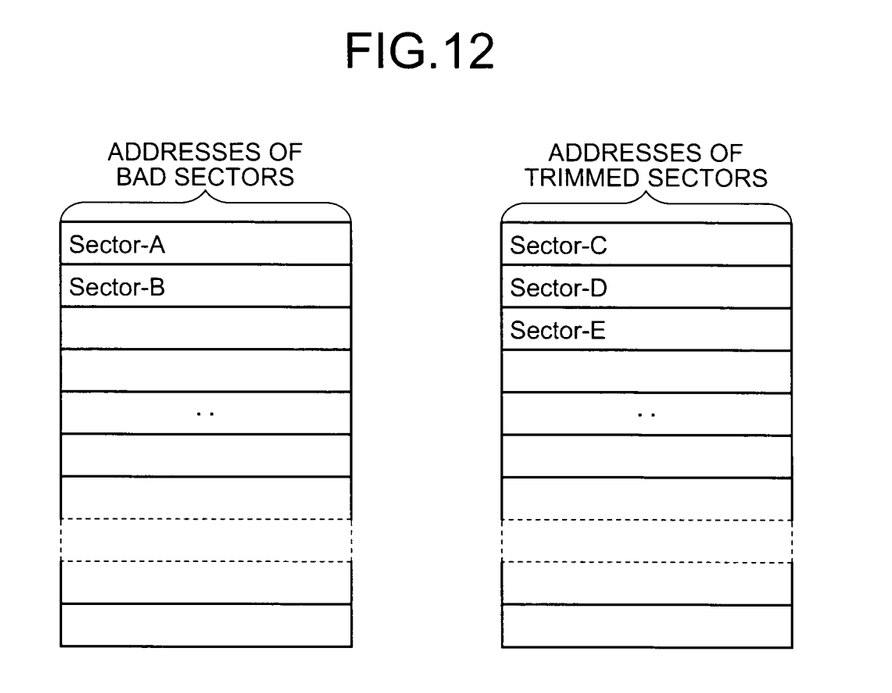
FIG. 12 is a drawing showing exemplary data structures of a bad sector storing unit and a trimmed sector storing unit.

In the embodiment described above, in the case where a plurality of types of special sectors are handled, and also, it is possible to distinguish the type of each of the special sectors by referring to the corresponding piece of management information stored in the address translation table storing unit 70, the special sector storing unit 80 may be configured with a bad sector storing unit that stores the sector addresses of bad sectors therein and a trimmed sector storing unit that stores the sector addresses of trimmed sectors therein. FIG. 12 is a drawing of exemplary data structures of the bad sector storing unit and the trimmed sector storing unit according to this modification example. As shown in FIG. 12, each of the sector addresses stored in the bad sector storing unit and the trimmed sector storing unit is not associated with the type of the special sector. The control unit 51 refers to the bad sector storing unit in the case where the piece of management information stored in the address translation table storing unit 70 indicates that one or more bad sectors are present, whereas the control unit 51 refers to the trimmed sector storing unit in the case where the piece of management information stored in the address translation table storing unit 70 indicates that trimmed sectors are present in the entirety of the page or that one or more trimmed sectors are present in a part of the page. With this arrangement, it is possible to manage the special sectors efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controller, comprising:
a first storing unit that stores therein page addresses indicating, in units of pages, physical storage positions within the storage area of a nonvolatile memory, and pieces of management information each indicating whether one or more special sectors, each being either a bad sector or a trimmed sector trimmed by a TRIM command, are present in a corresponding one of the pages, while a set of sector addresses each indicating a logical storage position within a storage area of the nonvolatile memory, a page address, and the pieces of management information are associated with each other;
a first judging unit that, in a case where an access to a specified sector address has been requested, refers to a corresponding one of the pieces of management information and judges whether one or more special sectors are present in a page identified by the page address corresponding to the specified sector address;
a generating unit that, in a case where one or more special sectors are present in the identified page, generates predetermined response data; and
a controlling unit that, in a case where no special sector is present in the identified page, accesses the storage position in the nonvolatile memory that corresponds to the specified sector address.

2. The controller according to claim 1, further comprising a first updating unit that, in a case where it has been requested that a specified first sector address should be registered as a special sector, updates a corresponding one of the pieces of management information stored in the first storing unit so as to indicate that one or more special sectors are present in a page identified by the page address corresponding to the specified first sector address.

3. The controller according to claim 2, wherein
each of the pieces of management information indicates one of the following situations: no special sector is present in the corresponding page, special sectors are present in an entirety of the corresponding page, and one or more special sectors are present in a part of the corresponding page, and
the first updating unit includes
a second judging unit that, in the case where it has been requested that the specified first sector address should be registered as a special sector, judges whether registering the specified first sector address results in a situation where special sectors are present in an entirety of the page identified by the page address corresponding to the specified first sector address; and a second updating unit that, in a case where it has been judged that the registration results in the situation where special sectors are present in the entirety of the page, updates the corresponding one of the pieces of management information stored in the first storing unit so as to indicate that special sectors are present in the entirety of the page and that, in a case where it has been judged that the registration results in the situation where special sectors are present in a part of the page, updates the corresponding one of the pieces of management information stored in the first storing unit so as to indicate that special sectors are present in a part of the page.

4. The controller according to claim 3, further comprising a second storing unit storing therein the sector addresses of the special sectors, wherein the first judging unit includes a third judging unit that, in a case where an access to a specified sector address has been requested, refers to a corresponding one of the pieces of management information and judges whether one or more special sectors are present in a page identified by the page address corresponding to the specified sector address; and a fourth judging unit that, in a case where it has been judged that one or more special sectors are present in the page, judges whether the specified sector address is stored in the second storing unit, the generating unit generates the response data in the case where it has been judged that the specified sector address is stored in the second storing unit, and in the case where it has been judged that the specified sector address is not stored in the second storing unit, the controlling unit accesses the storage position that corresponds to the specified sector address.

5. The controller according to claim 4, further comprising a storing controlling unit that, in a case where it has been requested that a specified first sector address should be registered as a special sector, stores the specified first sector address into the second storing unit.

6. The controller according to claim 5, wherein in a case where it has been requested that a specified first sector address should be registered as a special sector, and also, it has been judged that registering the specified first sector address does not result in a situation where special sectors are present in an entirety of a page identified by the page address corresponding to the specified first sector address, the storing controlling unit stores the specified first sector address into the second storing unit.

7. The controller according to claim 6, wherein in a case where it has been requested that a specified first sector address should be registered as a special sector, and also, it has been judged that registering the specified first sector address results in the situation where special sectors are present in the entirety of the page identified by the page address corresponding to the specified first sector address, the storing controlling unit deletes all sector addresses that correspond to the page address from the second storing unit.

8. The controller according to claim 7, wherein in a case where it has been requested that data should be written into a specified sector address, the third judging unit refers to a corresponding one of the pieces of management information and judges whether one or more special sectors are present in the corresponding page, in a case where it has been judged that the specified sector address is stored in the second storing unit, the controlling unit accesses one of the storage positions that corresponds to the specified sector address and writes the data into the storage position, in the case where it has been judged that the specified sector address is stored in the second storing unit, the generating unit generates response data indicating that writing of the data has been completed, and in the case where the specified sector address is stored in the second storing unit, the storing controlling unit deletes the specified sector address from the second storing unit.

9. The controller according to claim 8, wherein the first updating unit further includes a fifth judging unit that, in a case where it has been requested that data should be written into a specified sector address, and also, it has been judged that the specified sector address is stored in the second storing unit, judges whether any of other sector addresses corresponding to the page address that corresponds to the specified sector address is stored in the second storing unit; and a third updating unit that, in a case where it has been judged that none of the other sector addresses is stored in the second storing unit, updates a corresponding one of the pieces of management information stored in the first storing unit so as to indicate that no special sector is present in a corresponding one of the pages and that, in a case where it has been judged that one or more of the other sector addresses are stored in the second storing unit, updates the corresponding one of the pieces of management information stored in the first storing unit so as to indicate that special sectors are present in a part of the corresponding one of the pages.

10. The controller according to claim 9, wherein in a case where it has been requested that data should be written into a specified sector address, the third judging unit refers to a corresponding one of the pieces of management information and judges which one of the following situations applies: no special sector is present in the corresponding page, special sectors are present in an entirety of the corresponding page, and special sectors are present in a part of the corresponding page, and in a case where it has been judged that special sectors are present in the entirety of the corresponding page, the storing controlling unit stores the other sector addresses corresponding to the page address that corresponds to the specified sector address into the second storing unit.

* * * * *